(12) United States Patent
Larson

(10) Patent No.: US 8,352,504 B2
(45) Date of Patent: Jan. 8, 2013

(54) METHOD, SYSTEM AND PROGRAM PRODUCT FOR MANAGING A WORKLOAD ON A PLURALITY OF HETEROGENEOUS COMPUTING SYSTEMS

(75) Inventor: Robert A. Larson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1746 days.

(21) Appl. No.: 11/066,011

(22) Filed: Feb. 24, 2005

(65) Prior Publication Data
US 2006/0200822 A1 Sep. 7, 2006

(51) Int. Cl.
*G06F 17/30* (2006.01)
(52) U.S. Cl. ........ 707/799; 707/792; 707/793; 707/797; 707/803
(58) Field of Classification Search .................. 707/100, 707/101, 102, 103 R
See application file for complete search history.

(56) References Cited

U.S. PATENT DOCUMENTS

| | | | |
|---|---|---|---|
| 5,925,098 A | 7/1999 | Freund et al. | |
| 6,345,311 B1 | 2/2002 | Breslau et al. | |
| 6,681,251 B1 * | 1/2004 | Leymann et al. | 709/226 |
| 8,103,748 B2 | 1/2012 | Fontoura et al. | |
| 2001/0039575 A1 * | 11/2001 | Freund et al. | 709/223 |
| 2002/0010783 A1 | 1/2002 | Primak et al. | |
| 2003/0078820 A1 * | 4/2003 | Ouchi | 705/7 |
| 2003/0120828 A1 | 6/2003 | Clark et al. | |
| 2003/0188038 A1 | 10/2003 | Le et al. | |

\* cited by examiner

*Primary Examiner* — Farhan Syed
(74) *Attorney, Agent, or Firm* — William E. Schiesser; Hoffman Warnick LLC

(57) ABSTRACT

Under the present invention, a work request is received on one of the systems put into an application queue that corresponds to a process needed to fulfill the work request. Thereafter, an index enque queue is attempted to be allocated to the work request. If no such queue can be allocated in a predetermined amount of time, the work request can be re-routed to another system. If, however, the index enque queue is allocated within the predetermined amount of time, information relating to the work request is stored in a base enque queue, and a working directory with an output subdirectory is created. Data from the work request is stored in the working directory, and the process needed to fulfill the work request is selected and launched. Results of the fulfillment are stored in the output subdirectory for subsequent transfer back to system that originally sent the work request.

20 Claims, 4 Drawing Sheets

METHOD, SYSTEM AND PROGRAM PRODUCT FOR MANAGING A WORKLOAD ON A PLURALITY OF HETEROGENEOUS COMPUTING SYSTEMS

FIELD OF THE INVENTION

The present invention generally relates to workload balancing. Specifically, the present invention relates to a method, system and program product for managing a workload on a plurality of heterogeneous computing systems.

BACKGROUND OF THE INVENTION

In many current computing environments, it is common to implement a plurality of heterogeneous computing systems whereby several different platforms/operating systems are implemented. For example, in an environment having eight computing systems (e.g., one mainframe and seven clients), it could be the case that the mainframe contains a z/OS operating system, while three clients contain AIX operating systems, and the four other clients contain Windows-based operating systems. With such platform disparity, performing basic tasks such as data conversion can often be complex and work intensive.

For example, assume that there is a requirement in the above environment to have Computer-Aided Design (CAD) data transformed/converted between data formats. For example, original CAD data could have to be converted to Postscript and then to PDF. Under current implementations, the data could have to be moved between all three platforms for complete transformation to occur. That is, to accomplish such a transformation under existing systems, the original CAD data could have to be moved from the z/OS-based mainframe to one of the AIX-based clients so that Postscript conversion can occur. Next, the resulting Postscript data would have to be moved to one of the Windows-based client so that PDF conversion can occur. No existing system minimizes the number of movements that must occur while controlling how many processes run on each machine.

In view of the foregoing, there exists a need for a method, system and program product for managing a workload on a plurality of heterogeneous computing systems. Specifically, a need exists for managing a workload in a cluster of computing systems having multiple different platforms, whereby the number of data movements is minimized. A further need exists for such a system to control a number of processes that execute (in parallel) on each system.

SUMMARY OF THE INVENTION

In general, the present invention provides a method, system and program product for managing a workload on a plurality of heterogeneous computing systems (hereinafter "systems"). Specifically, under the present invention, a work request is created on a mainframe and then routed to one of the systems, and put/stored in an application queue that corresponds to a process needed to fulfill the work request. Thereafter, an index enque queue is attempted to be allocated exclusively to the work request. If no such queue can be allocated exclusively in a predetermined amount of time, the work request can be re-routed to another system. If, however, the index enque queue is allocated within the predetermined amount of time, information relating to the work request is stored in a base enque queue, and a working directory with an output subdirectory is created. Data from the work request is stored in the working directory and the process needed to fulfill the work request is selected and launched. Results of the fulfillment are stored in the output subdirectory for subsequent transfer back to the mainframe that originally sent the work request.

A first aspect of the present invention provides a method for managing a workload on a plurality of heterogeneous computing systems, comprising: receiving a work request on one of the plurality of heterogeneous computing systems; putting the work request in a particular application queue that corresponds to a process needed to fulfill the work request; and attempting to allocate an index enque queue to the work request within a predetermined period of time, wherein another one of the plurality of heterogeneous computing systems is selected to fulfill the work request if the index enque queue cannot be allocated within the predetermined period of time.

A second aspect of the present invention provides a system for managing a workload on a plurality of heterogeneous computing systems, comprising: a system for attempting to allocate an index enque queue, within a predetermined period of time, to a work request stored in an application queue of one of the plurality of heterogeneous computing systems as received from another one of the plurality of heterogeneous computing systems; a system for creating a temporary directory and an output subdirectory on the one of the plurality of heterogeneous computing systems when the index enque queue is allocated; a system for storing data from the work request in the temporary directory; and a system for selecting and execute a process to fulfill the work request, wherein the process is selected based on the application queue in which the work request is stored.

A third aspect of the present invention provides a program product stored on a computer readable medium for managing a workload on a plurality of heterogeneous computing systems, the computer readable medium comprising program code for performing the following steps: attempting to allocate an index enque queue, within a predetermined period of time, to a work request stored in an application queue of one of the plurality of heterogeneous computing systems as received from another one of the plurality of heterogeneous computing systems; creating a temporary directory and an output subdirectory on the one of the plurality of heterogeneous computing systems when the index enque queue is allocated; storing data from the work request in the temporary directory; and selecting and executing a process to fulfill the work request, wherein the process is selected based on the application queue in which the work request is stored.

A fourth aspect of the present invention provides a method for deploying an application for managing a workload on a plurality of heterogeneous computing systems, comprising: providing a computer infrastructure being operable to: attempt to allocate an index enque queue, within a predetermined period of time, to a work request stored in an application queue of one of the plurality of heterogeneous computing systems as received from another one of the plurality of heterogeneous computing systems; create a temporary directory and an output subdirectory on the one of the plurality of heterogeneous computing systems when the index enque queue is allocated; store data from the work request in the temporary directory; and select and executing a process to fulfill the work request, wherein the process is selected based on the application queue in which the work request is stored.

Therefore, the present invention provides a method, system and program product for managing a workload on a plurality of heterogeneous computing systems.

BRIEF DESCRIPTION OF THE DRAWINGS

These and other features of this invention will be more readily understood from the following detailed description of the various aspects of the invention taken in conjunction with the accompanying drawings in which.

Figure 1:
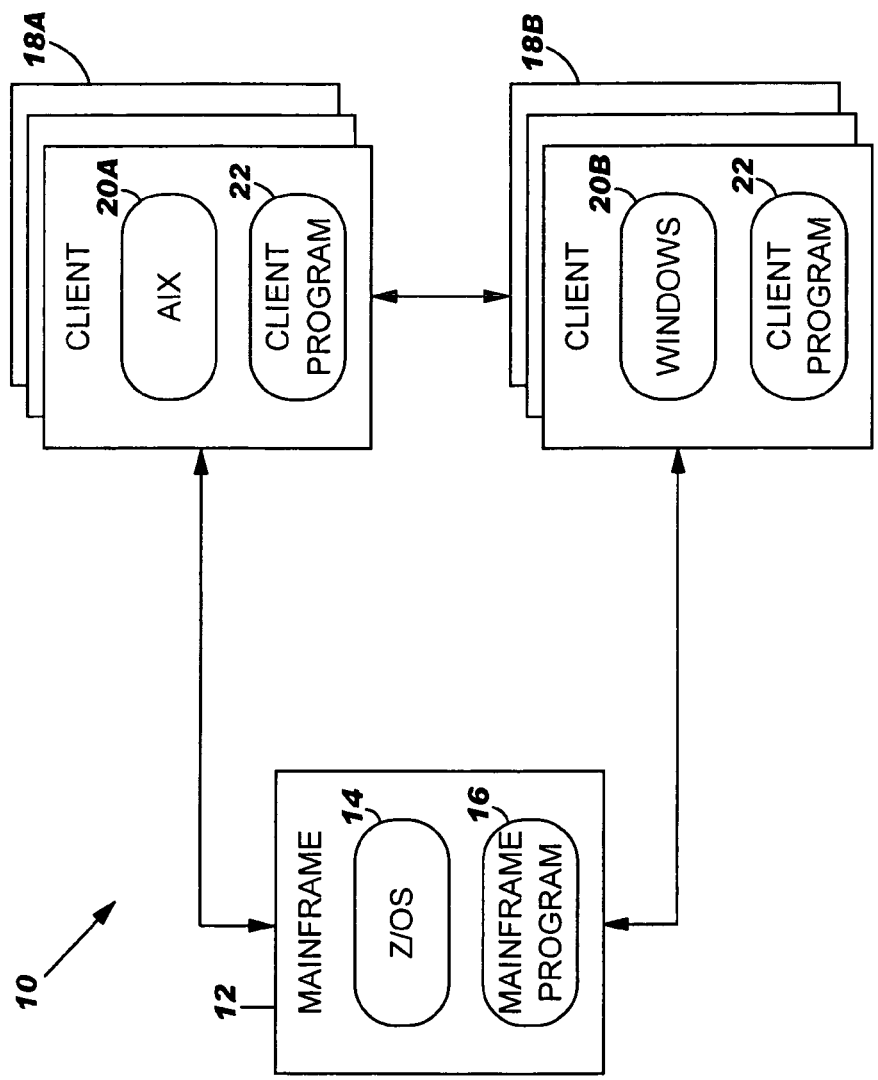
FIG. 1 depicts a plurality of heterogeneous computing systems according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode of Carrying Out the Invention will have the following sections
I. General Description
II. Illustrative Example I. General Description As indicated above, the present invention provides a method, system and program product for managing a workload on a plurality of heterogeneous computing systems (hereinafter "systems"). Specifically, under the present invention, a work request is created on a mainframe and then routed to one of the systems, and put/stored in an application queue that corresponds to a process needed to fulfill the work request. Thereafter, an index enque queue is attempted to be allocated exclusively to the work request. If no such queue can be allocated exclusively in a predetermined amount of time, the work request can be re-routed to another system. If, however, the index enque queue is allocated within the predetermined amount of time, information relating to the work request is stored in a base enque queue, and a working directory with an output subdirectory is created. Data from the work request is stored in the working directory and the process needed to fulfill the work request is selected and launched. Results of the fulfillment are stored in the output subdirectory for subsequent transfer back to the mainframe that originally sent the work request.

Referring now to FIG. 1 an illustrative cluster 10 comprising a plurality of heterogeneous computing systems 12, 18A-B is shown. As depicted, illustrative cluster 10 includes server/mainframe 12 and clients 18A-B, which are intended to represent any type of computer systems capable of carrying out the teachings of the present invention. For example, mainframe 12 and/or clients 18A-B could each be a laptop computer, a desktop computer, a workstation, a handheld device, etc. Moreover, cluster 10 is typically implemented over a network such as the Internet, a local area network (LAN), a wide area network (WAN), a virtual private network (VPN), etc. Communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown, the computer systems within cluster 10 have different platforms. For example, mainframe 12 contains the z/OS platform, clients 18A contain the AIX platform, while clients 18B contain a Windows platform. It should be understood that these platforms are shown for illustrative purposes only and that the teachings of the present invention are not limited to the three platforms depicted in FIG. 1. Regardless, prior to the present invention, performing a data operation such as data conversion in such a cluster 10 often required multiple transfers of the data between the various computer systems. To alleviate this and other problems, clients 18A-B are equipped with client programs 22 and mainframe 12 with server program 16.

II. Illustrative Example

Figure 2:
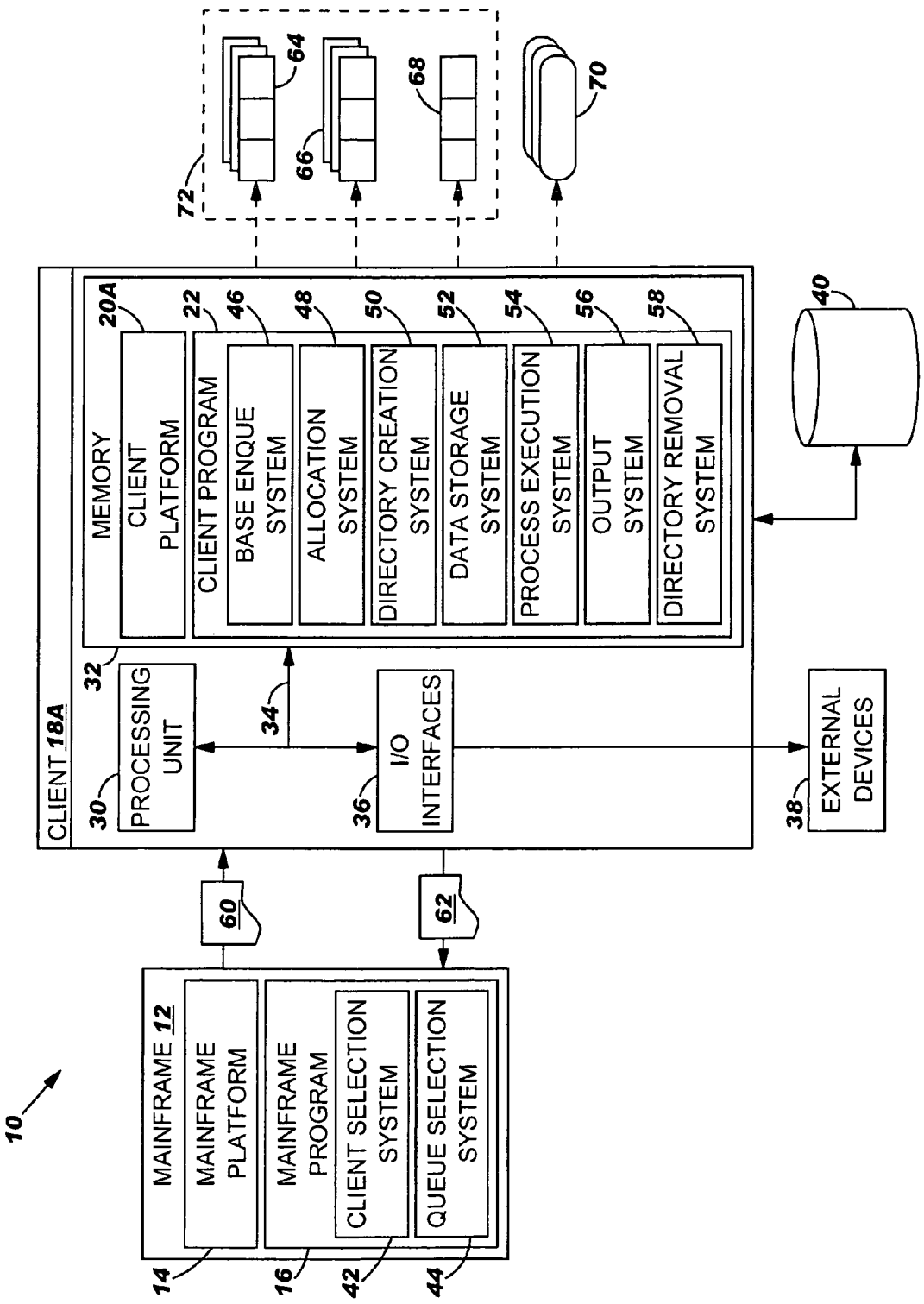
FIG. 2 depicts a system for managing a workload on a plurality of heterogeneous computing systems according to the present invention.

Referring now to FIG. 2, the teachings of the present invention will be described in conjunction with an illustrative example. For the purposes of this example, assume that a conversion of CAD data is desired. Under the present invention, when such a conversion is desired, corresponding data will be packaged into a work request 60 on mainframe 12. In order to prevent multiple transfers between computer systems of cluster 10, client selection system 42 of mainframe program 16 will select an appropriate client that can perform the complete conversion (e.g., client 18A in this example). The work request 60 will then be transmitted thereto. In a typical embodiment, work request 60 can contain two "messages." The first message can be an XML header describing the process that is needed along with any parameters. The second message comprises a .Zip file or the like that contains the actual data for the process. To this extent, mainframe program 16 can be based upon a messaging program such as WebSphere MQ, which is commercially available from International Business Machines Corp. of Armonk, N.Y. Once an appropriate client 18A has been selected, queue selection system 44 of mainframe program 16 will then select an application queue 64 of client 18A for receiving the work request 60. In a typical embodiment, a plurality of application 64 queues are provided. Each application queue 64 corresponds to a particular process 70 (on client 18A) that is used to fulfill such work requests.

As further shown, client 18A generally includes processing unit 30, memory 32, bus 34, input/output (I/O) interfaces 36, external devices/resources 38 and storage unit 40. Processing unit 30 may comprise a single processing unit, or be distributed across one or more processing units in one or more locations, e.g., on a client and server. Memory 32 may comprise any known type of data storage and/or transmission media, including magnetic media, optical media, random access memory (RAM), read-only memory (ROM), a data cache, a data object, etc. Moreover, similar to processing unit 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LED screen, hand-held device, keyboard, mouse, voice recognition system, speech output system, printer, monitor/display, facsimile, pager, etc. Bus 34 provides a communication link between each of the components in client 18A and likewise may comprise any known type of transmission link, including electrical, optical, wireless, etc.

Storage unit 40 can be any type of system (e.g., a direct access storage device) capable of providing storage for information (e.g., data, work requests, etc.) under the present invention. As such, storage unit 40 could include one or more storage devices, such as a magnetic disk drive or an optical disk drive. In another embodiment, storage unit 40 includes data distributed across, for example, a local area network (LAN), wide area network (WAN) or a storage area network (SAN) (not shown). Although not shown, additional components, such as cache memory, communication systems, system software, etc., may be incorporated into client 18A. It should be understood that other clients 18A-B as well as mainframe 12 will include computerized components similar to client 18A. Such components have not been shown for brevity purposes.

In any event, shown in memory 32 of client 18A is client platform 20A and client program 22. As mentioned above, work request 60 is received by client and is put/stored in an appropriate application queue 64. It should be appreciated, however, that queue selection system 44 could be part of client program 22 as opposed to mainframe program 16. In such an embodiment, mainframe program 12 would select client 18A and route the work request 60 thereto. Upon receipt by client 18A, queue selection system 44 within client program 22 would select appropriate application queue 64 based on the process 70 that is needed to fulfill work request 60.

Regardless, once work request 60 is stored in application queue 64, base enque system 46 will check base enque queue 68 for any messages indicating disablement of index enque queues 66. If so, work request 60 is routed to another client (not shown). Assuming no such messages are present, allocation system 48 will attempt to allocate an index enque queue 66 to work request 60 within a predetermined period/amount of time. The use of index enque queues 66 allow the present invention to control the number of processes 70 that are running in parallel. If an index enque queues 66 is not allocated within the predetermined amount of time, the method can sleep and be attempted again at a later time, or work request 60 can be routed to another client 18A-B for the method to be attempted there. Assuming that an index enque queue 66 is allocated within the predetermined period of time, allocation system 48 will then store information pertaining to the work request 60 and the corresponding process 70 in base enque queue 68

As depicted in FIG. 2, the present invention thus provides three different types of queues as managed by a local queue manager 72 on each client. Specifically, each client such as client 18A includes application queues 64, index enque queues 66 and base enque queue 68. Application queues 64 are "cluster" queues to which work requests are routed. Base enque queue 68 is a "non-cluster" queue whose name is defined in a user data field of an associated (MQ) process object. As indicated above, when an index enque queue 66 is successfully allocated, a message/information is added to base enque queue 68 listing specific attribute about the function to be performed. When the process 70 has completed the work request 60, the information is removed from base enque queue 68. The third type of queue provided is the index enque queues 66 that are allocated to work requests. In a typical embodiment, index enque queues 66 are "non-cluster" queues whose names are the same as base enque queue 68 except with a value appended. Specifically, when a work request 60 is received in an application queue 64, allocation system 48 will attempt to open an index enque queue whose name matches base enque queue 68 with a "0.1" suffix. If this index enque queue cannot be opened because it is in use, then allocation system 48 will try to open an index enque queue with the "0.2" suffix. This process continues until an index enque queue 66 can be opened or the predetermined amount of time expires.

Central to this concept is that multiple application queues 64 (and index enque queues 66) can be assigned to a common base enque queue 68. This allows for multiple disparate server processes to be controlled centrally. For example, assume that there are application queues for programs called Catia V5 Drawing Import, Catia V5 Part Import, and Cat V5 Product (assembly) Import. Further assume that licenses are issued at the Catia V5 level, such that the number of Catia V5 processes allowed to run must be restricted. In such a case, a single base enque queue 68 entitled CATIAV5 could be provided. Then, all Catia V5 processes could be funneled therethrough. To this extent, the number of index enque queues 66 created depends on the number of (e.g., Catia V5) processes that are desired to be run at the same time. It should be understood that queue manager 72 as well as the different queues 64, 66 and 68 are typically loaded on client 18A. They have been shown outside of client 18A in dashed line format for clarity of the illustration only.

In any event, once an index enque queue 66 has been allocated to work request 60 and related information has been stored in base enque queue 68, directory creation system 50 will create a temporary working directory with an output sub directory on client 18A. Thereafter, data storage system 52 will store the data from work request 60 (e.g. the CAD data to be converted) in the working directory. This process would include unzipping any .Zip files containing the data. Once this has occurred, process execution system 54 will select and execute the appropriate process 70 needed to fulfill the request. In a typical embodiment, the appropriate process 70 can be identified/selected based upon the application queue 64 in which work request 60 was stored. Specifically, as indicated above, each application queue 64 can correspond to a particular process 70. Thus the process 70 corresponding to the application queue 64 in which work request 60 was stored can be selected and executed. In executing the process 70, the name of the working directory (and subdirectory) will be passed to the process 70.

If the process is successful, results of the fulfillment will be stored in the output subdirectory. If, however, the process 70 failed, the working directory can be moved to a secondary location and a message (e.g., MQ message) can be created to indicate the failure. If the failure is severe, a message can be added to the base enque queue 68 indicating the no further jobs should be permitted to run. In addition, the associated application queue 64 can be set to "Put Inhibited." This collective "failure" functionality can be provided by any of the subsystems shown within client program 22, or by a separate "failure" subsystem not shown.

Assuming, however, that the work request 60 was successfully fulfilled, the results 62 will be output by output system 56 from the output subdirectory back to mainframe 12 (or whatever computer system sent the work request 60 to client 18A in the first place). Thereafter, directory removal system 58 will remove the working directory and output subdirectory and base enque system 46 will remove any message/information relating thereto from base enque queue 68 and the allocated index enque 66 will be released.

Figure 3:
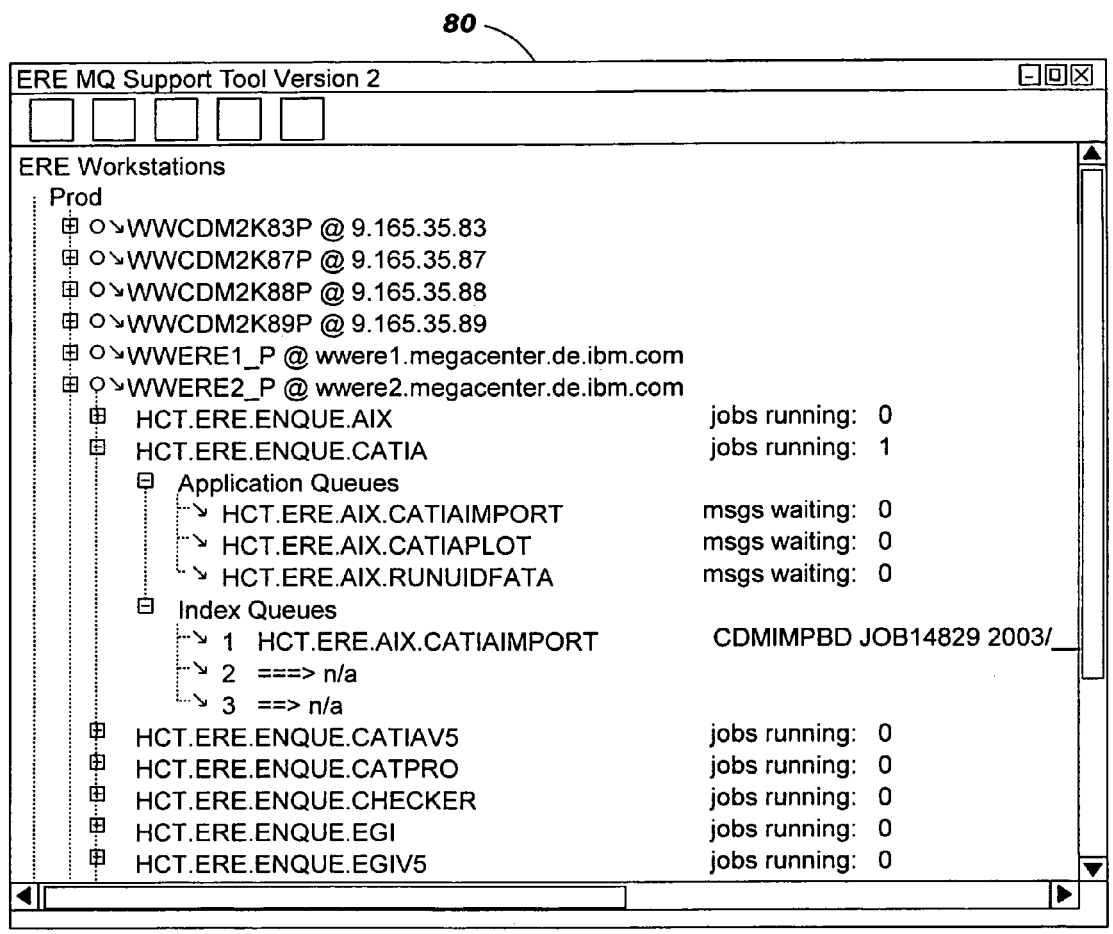
FIG. 3 depicts an illustrative screen shot according to the present invention.

It should be understood that the present invention also provides a central place for an administrator to monitor and control all aspects of the environment. This functionality is typically provided by mainframe program 16 of mainframe 12. Referring to FIG. 3, an illustrative screen shot 80 of this concept is shown. Underneath the "Prod" branch of screen shot 80, all queue managers for clients 18A-B are listed. Within the queue manager branches are listed all of the base enque queue names. Underneath these branches, the application queues and index enque queues (with just their suffix number) are shown. In the example shown in screenshot 80, there are no messages waiting to be processed, but there is a job currently being processed. This job has acquired index enque queue number 1. Next to the queue number there is process specific information that allows the administrator to watch or debug any problems. In each location where an arrow is shown, the administrator can select the corresponding MQ Object and disable it allowing for further control of how many processes are allowed to run in parallel and on which machines.

Figure 4:
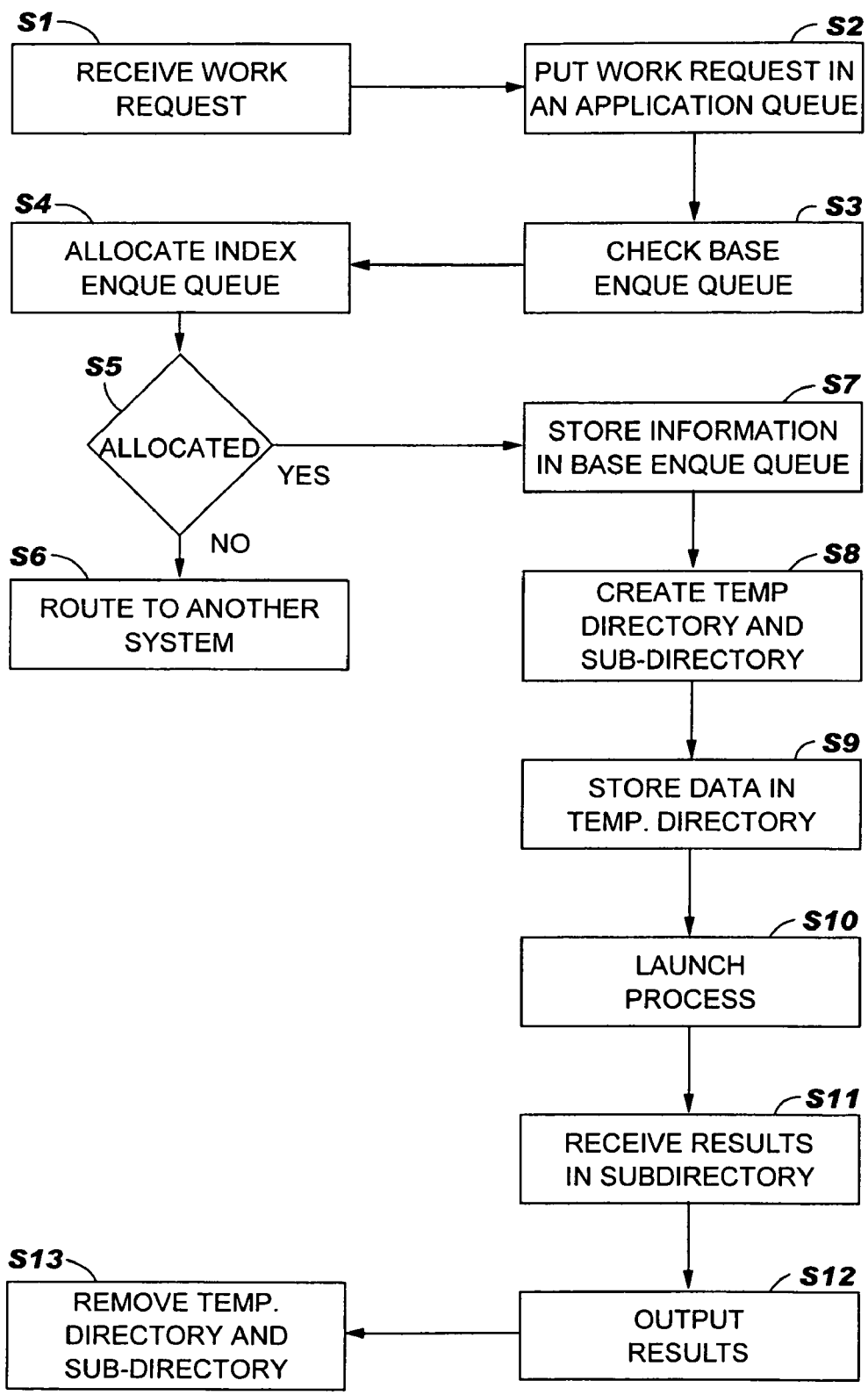
FIG. 4 depicts a method flow diagram according to the present invention.

Referring now to FIG. 4, an illustrative method flow diagram 100 according to the present invention is shown. First step S1 is to receive a work request on one of the plurality of heterogeneous computing systems. Second step S2 is to put the work request to in a particular application queue that corresponds to a process needed to fulfill the work request. Third step S3 is to check the base enque queue for any messages indicating disablement of the queue group. Fourth step S4 is to attempt to allocate an index enque queue to the work request within a predetermined period of time. If, in step S5, an index enque queue cannot be allocated within the predetermined period of time, the work request is routed to another computer system in step S6. If, however, the index enque queue can be allocated in such a time, information relating to the work request is stored in a base enque queue in step S7. Then, in step S8, a temporary directory with an output subdirectory is created. In step S9, data from the work request is stored in the temporary directory. In step S10, the process to fulfill the work request is launched. Results of the fulfillment are stored in the output subdirectory in step S11, and then output to the client in step S12. Thereafter, the working directory and the output subdirectory are removed in step S13.

It should be appreciated that the present invention could be offered as a business method on a subscription or fee basis. For example, mainframe 12, mainframe program 16, clients 18A-B and/or client programs 22 could be created, supported, maintained and/or deployed by a service provider that offers the functions described herein for customers. That is, a service provider could offer to process work requests for customers.

It should also be understood that the present invention could be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, mainframe program 16 and client program 22 are shown with a certain configuration of sub-systems for illustrative purposes only.

I claim:

1. A computer-implemented method for managing a workload on a plurality of heterogeneous client computing systems, comprising:
   receiving a work request from a server on one of the plurality of heterogeneous client computing systems;
   putting the work request in a particular application queue that corresponds to a process needed to fulfill the work request; and
   attempting to allocate an index enque queue to the work request within a predetermined period of time, wherein when the index enque queue is allocated:
      storing information relating to the work request in a base enque queue;
      creating a temporary directory with an output subdirectory;
      storing data from the work request in the temporary directory; and
      selecting and launching the process to fulfill the work request, wherein the process is selected based on the particular application queue in which the work request was put;
   and wherein another one of the plurality of heterogeneous client computing systems is selected to fulfill the work request when the index enque queue cannot be allocated within the predetermined period of time.

2. The method of claim 1, wherein the work request comprises a message that is received by a local queue manager on the one of the plurality of heterogeneous client computing systems from a mainframe.

3. The method of claim 2, wherein the mainframe and the one of the plurality of heterogeneous client computing systems contain different platforms.

4. The method of claim 1, wherein the work request comprises a request to convert data from a first format to a second format.

5. The method of claim 1, further comprising:
   receiving results of the fulfillment in the output directory;
   sending the results to a mainframe from which the work request was received; and
   removing the temporary directory and the output subdirectory after the results have been sent to the mainframe.

6. The method of claim 1, wherein the particular application queue is selected from a plurality of application queues, and wherein the index enque queue is allocated from a plurality of index enque queues.

7. The method of claim 6, wherein the plurality of application queues is assigned to a single base enque queue.

8. A system for managing a workload on a plurality of heterogeneous client computing systems, comprising:
   a system for receiving a work request from a server on one of the plurality of heterogeneous client computing systems;
   a system for putting the work request in a particular application queue that corresponds to a process needed to fulfill the work request;

a system for attempting to allocate an index enque queue, within a predetermined period of time, to the work request originating from the server and stored in an application queue of one of the plurality of heterogeneous client computing systems as received from another one of the plurality of heterogeneous client computing systems;

a system for creating a temporary directory and an output subdirectory on the one of the plurality of heterogeneous client computing systems when the index enque queue is allocated;

a system for storing data from the work request in the temporary directory; and a system for selecting and executing a process to fulfill the work request, wherein the process is selected based on the application queue in which the work request is stored, and wherein another one of the plurality of heterogeneous client computing systems is selected to fulfill the work request when the index enque queue cannot be allocated within the predetermined period of time.

9. The system of claim 8, further comprising:
a system for checking a base enque queue for any messages indicated queue disablement when the work request is received; and
a system for storing information related to the work request in the base enque queue when the index enque queue is allocated.

10. The system of claim 8, further comprising:
a system for outputting results of the fulfillment of the work request from the output subdirectory on the one of the plurality of heterogeneous client computing systems to the other one of the plurality of heterogeneous client computing systems from which the work request was received; and
a system for removing the temporary directory and the output subdirectory after the results have been output.

11. The system of claim 8, further comprising a system for selecting a new one of the plurality of heterogeneous client computing systems to fulfill the work request if the index enque queue cannot be allocated within the predetermined period of time.

12. The system of claim 8, wherein the one of the plurality of heterogeneous client computing systems and the other one of the plurality of heterogeneous client computing systems contain different platforms.

13. The system of claim 8, wherein the application queue is selected from a plurality of application queues, and wherein the index enque queue is allocated from a plurality of index enque queues.

14. A program product stored on a computer readable storage medium for managing a workload on a plurality of heterogeneous client computing systems, the computer readable medium comprising program code for performing the following steps:

receiving a work request from a server on one of the plurality of heterogeneous client computing systems;

putting the work request in a particular application queue that corresponds to a process needed to fulfill the work request;

attempting to allocate an index enque queue, within a predetermined period of time, to the work request originating from the server and stored in an application queue of one of the plurality of heterogeneous client computing systems as received from another one of the plurality of heterogeneous client computing systems;

creating a temporary directory and an output subdirectory on the one of the plurality of heterogeneous client computing systems when the index enque queue is allocated;

storing data from the work request in the temporary directory; and selecting and executing a process to fulfill the work request, wherein the process is selected based on the application queue in which the work request is stored, and wherein another one of the plurality of heterogeneous client computing systems is selected to fulfill the work request when the index enque queue cannot be allocated within the predetermined period of time.

15. The program product of claim 14, wherein the computer readable medium further comprises program code for performing the following steps:
checking a base enque queue for any messages indicated queue disablement when the work request is received; and
storing information related to the work request in the base enque queue when the index enque queue is allocated.

16. The program product of claim 14, wherein the computer readable medium further comprises program code for performing the following steps:
outputting results of the fulfillment of the work request from the output subdirectory on the one of the plurality of heterogeneous client computing systems to the other one of the plurality of heterogeneous client computing systems from which the work request was received; and
removing the temporary directory and the output subdirectory after the results have been output.

17. The program product of claim 14, further wherein the computer readable medium further comprises program code for performing the following step:
selecting a new one of the plurality of heterogeneous client computing systems to fulfill the work request if the index enque queue cannot be allocated within the predetermined period of time.

18. The program product of claim 14, wherein the one of the plurality of heterogeneous client computing systems and the other one of the plurality of heterogeneous client computing systems contain different platforms.

19. The program product of claim 14, wherein the application queue is selected from a plurality of application queues, and wherein the index enque queue is allocated from a plurality of index enque queues.

20. A computer-implemented method for deploying an application for managing a workload on a plurality of heterogeneous client computing systems, comprising:
providing a computer infrastructure being operable to:
receive a work request from a server on one of the plurality of heterogeneous client computing systems;
put the work request in a particular application queue that corresponds to a process needed to fulfill the work request;
attempt to allocate an index enque queue, within a predetermined period of time, to the work request originating from the server and stored in an application queue of one of the plurality of heterogeneous client computing systems as received from another one of the plurality of heterogeneous client computing systems;
create a temporary directory and an output subdirectory on the one of the plurality of heterogeneous client computing systems when the index enque queue is allocated;
store data from the work request in the temporary directory; and select and execute a process to fulfill the work request,
   wherein the process is selected based on the application queue in which the work request is stored, and
wherein another one of the plurality of heterogeneous client computing systems is selected to fulfill the work request when the index enque queue cannot be allocated within the predetermined period of time.

* * * * *